United States Patent
Sumikawa et al.

(10) Patent No.: US 12,077,166 B2
(45) Date of Patent: Sep. 3, 2024

(54) DRIVING SUPPORT APPARATUS

(71) Applicant: SUBARU CORPORATION, Tokyo (JP)

(72) Inventors: Ryuichi Sumikawa, Tokyo (JP); Takeshi Torii, Tokyo (JP); Hideyuki Takao, Tokyo (JP); Riku Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 326 days.

(21) Appl. No.: 17/484,599

(22) Filed: Sep. 24, 2021

(65) Prior Publication Data

US 2022/0097715 A1 Mar. 31, 2022

(30) Foreign Application Priority Data

Sep. 29, 2020 (JP) .................................. 2020-163280

(51) Int. Cl.
*B60W 40/09* (2012.01)
*B60W 30/02* (2012.01)
*B60W 50/14* (2020.01)

(52) U.S. Cl.
CPC ............ *B60W 40/09* (2013.01); *B60W 30/02* (2013.01); *B60W 50/14* (2013.01)

(58) Field of Classification Search
CPC ...... B60W 40/09; B60W 30/02; B60W 50/14; B60W 30/025; B60W 2554/406; B60W 2540/00

(Continued)

(56) References Cited

U.S. PATENT DOCUMENTS

2016/0023596 A1* 1/2016 Konet .................... B60Q 5/008
340/467
2017/0349185 A1* 12/2017 McNew ................... G05B 9/02
(Continued)

FOREIGN PATENT DOCUMENTS

JP 2010-149576 A 7/2010
JP 2012-198344 A 10/2012
JP 2020-066253 A 4/2020

OTHER PUBLICATIONS

Notice of Reasons for Refusal received in corresponding Japanese Patent Application No. 2020-163280, dated May 14, 2024.

*Primary Examiner* — Todd Melton
*Assistant Examiner* — Vincent Feng
(74) *Attorney, Agent, or Firm* — Rimon P.C.

(57) ABSTRACT

A driving support apparatus includes a controller. The controller is configured to obtain data indicating behavior of a body of a vehicle while the vehicle is driving. The controller is configured to continuously output a sound that is to be changed in accordance with the behavior while the vehicle is driving. The controller is configured to set a predetermined threshold for a value indicating magnitude of the behavior, based on a driving condition of the vehicle. The controller is configured to change the sound in accordance with the value indicating the magnitude of the behavior in a case where the value indicating the magnitude of the behavior is smaller than the predetermined threshold. The controller is configured to execute predetermined control in a case where the value indicating the magnitude of the behavior is greater than or equal to the predetermined threshold.

7 Claims, 6 Drawing Sheets (58) Field of Classification Search
USPC .............................................................. 701/1
See application file for complete search history.

(56) References Cited

U.S. PATENT DOCUMENTS

2019/0359058 A1* 11/2019 Sato .................. B60R 21/01516
2021/0246980 A1* 8/2021 Yoshikawa .............. B60Q 9/00

* cited by examiner

| | | | |
|---|---|---|---|
| DRIVER ATTRIBUTE INFORMATION | DRIVER'S AGE | ELDERLY | UPPER LIMIT VALUE: LARGER | DATA TYPES: FEWER |
| | TIME AFTER DRIVER HAS OBTAINED LICENSE | LONGER ↔ SHORTER | UPPER LIMIT VALUE: SMALLER ↔ LARGER | DATA TYPES: MORE ↔ FEWER |
| | DRIVING FREQUENCY | HIGHER ↔ LOWER | UPPER LIMIT VALUE: SMALLER ↔ LARGER | DATA TYPES: MORE ↔ FEWER |
| | BLANK PERIOD | LONGER | UPPER LIMIT VALUE: LARGER | DATA TYPES: FEWER |
| DRIVING ENVIRONMENT INFORMATION | MANY PEDESTRIANS AND BICYCLES / HEAVY TRAFFIC / SCHOOL ROAD (COMMUTING TIME) / NARROW ROAD | MORE DANGEROUS | UPPER LIMIT VALUE: SMALLER | DATA TYPES: MORE |
| | HEAVY RAINFALL/SNOWFALL / STRONG WIND / ACCUMULATED SNOW / ICY ROAD | MORE DANGEROUS | UPPER LIMIT VALUE: SMALLER | DATA TYPES: MORE |

DRIVING SUPPORT APPARATUS

CROSS-REFERENCE TO RELATED APPLICATIONS

The present application claims priority from Japanese Patent Application No. 2020-163280 filed on Sep. 29, 2020, the entire contents of which are hereby incorporated by reference.

BACKGROUND

The disclosure relates to a driving support apparatus that assists a driver in improving driver performance.

Driver performance is different among drivers and influences ride comfort and road safety. Various devices have thus been proposed to judge driver performance and give judging results and some advice to a driver.

Japanese Unexamined Patent Application Publication (JP-A) No. 2012-198344 discloses a driving support apparatus that judges driver performance with high precision and informs a driver of the total performance evaluation each time the driver drives so as to assist the driver in improving performance for the next time. This driving support apparatus includes an acceleration change calculator, a jerk calculator, a performance judger, and a total performance judger. The acceleration change calculator calculates a first correlation value correlated to an amount of change in the acceleration. The jerk calculator calculates a second correlation value correlated to a jerk. The performance judger judges from the first and second correlation values whether the driver performance regarding the driving that the driver has just done is smooth or jerky, based on preset judgement criteria using a vibration model. The total performance judger calculates a score for the judgement result determined by the performance judger. The total performance judger then divides this score by the number of times the performance judger has made a judgement about this performance so as to calculate a first evaluation index. The total performance judger then calculates a total evaluation score for this performance, based on the first evaluation index.

SUMMARY

An aspect of the disclosure provides a driving support apparatus including a controller. The controller is configured to obtain data indicating behavior of a body of a vehicle while the vehicle is driving. The controller is configured to continuously output a sound that is to be changed in accordance with the behavior while the vehicle is driving. The controller is configured to set a predetermined threshold for a value indicating magnitude of the behavior, based on a driving condition of the vehicle. The controller is configured to change the sound in accordance with the value indicating the magnitude of the behavior in a case where the value indicating the magnitude of the behavior is smaller than the predetermined threshold. The controller is configured to execute predetermined control in a case where the value indicating the magnitude of the behavior is greater than or equal to the predetermined threshold.

An aspect of the disclosure provides a driving support apparatus including circuitry. The circuitry is configured to obtain data indicating behavior of a body of a vehicle while the vehicle is driving. The circuitry is configured to continuously output a sound that is to be changed in accordance with the behavior while the vehicle is driving. The circuitry is configured to set a predetermined threshold for a value indicating magnitude of the behavior, based on a driving condition of the vehicle. The circuitry is configured to change the sound in accordance with the value indicating the magnitude of the behavior in a case where the value indicating the magnitude of the behavior is smaller than the predetermined threshold. The circuitry is configured to execute predetermined control in a case where the value indicating the magnitude of the behavior is greater than or equal to the predetermined threshold.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

The driving support apparatus disclosed in JP-A No. 2012-198344 evaluates the overall driver performance regarding the driving that a driver has just done. It is thus difficult for the driver to understand at which particular driving time point the performance has been evaluated. To address this issue, an evaluation result or advice about driver performance may be given to a driver in text as an image or voice while the driver is driving. In this case, however, the driver may be distracted from driving while checking the evaluation result or the advice.

It is desirable to provide a driving support apparatus that allows a driver to be informed of driver performance evaluation in real time during driving without being seriously distracted from driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overview of Driving Support Apparatus

An overview of a driving support apparatus according to the embodiment will first be given below. While a vehicle is driving, the driving support apparatus obtains data indicating behavior of the vehicle body and continuously outputs a sound that is changed in accordance with the behavior of the vehicle body. The behavior of the vehicle body reflects steering, accelerating, and braking operations of a driver, for example. The driver is thus able to intuitively understand the driver performance evaluation in real time via auditory stimulation.

When a value indicating the magnitude of the behavior of the vehicle body is smaller than a predetermined threshold (upper limit value), the sound continuously output from the driving support apparatus is sequentially changed in accordance with variations of this value. The driver is thus able to intuitively recognize a change in the behavior of the vehicle body in real time via auditory stimulation. When the value indicating the magnitude of the behavior is greater than or equal to the predetermined threshold (upper limit value), the driving support apparatus continuously outputs a fixed, flat sound. The driver is thus able to recognize that the stability of the behavior of the vehicle body is low and is induced to improve driver performance so that the behavior of the vehicle body can be more stable.

In the embodiment, the driving support apparatus sets the above-described predetermined threshold (upper limit value) based on driving conditions of the vehicle. The driving conditions used for setting the threshold (upper limit value) are those that influence the stability of the behavior of the vehicle body. In the embodiment, as information about the driving conditions of a vehicle, information about driver's attributes related to the driving skills of the driver and information related to conditions that influence the behavior stability of the vehicle body are used. With this configuration, a region where the output sound is sequentially changed in response to variations of the value indicating the magnitude of the behavior of the vehicle body or how the output sound is changed in response to variations of this value are adjusted in accordance with the driving conditions of the vehicle. Moreover, the above-described upper limit value is also adjusted in accordance with the driving conditions of the vehicle. This can lead the driver to drive in a suitable manner in accordance with the driving skills of the driver and the conditions that influence the stability of the behavior of the vehicle body. Note that the driver's attributes may include the driving skills.

The driving support apparatus according to the embodiment will be described below through illustration of an example.

2. Configuration of Driving Support Apparatus

Figure 1:
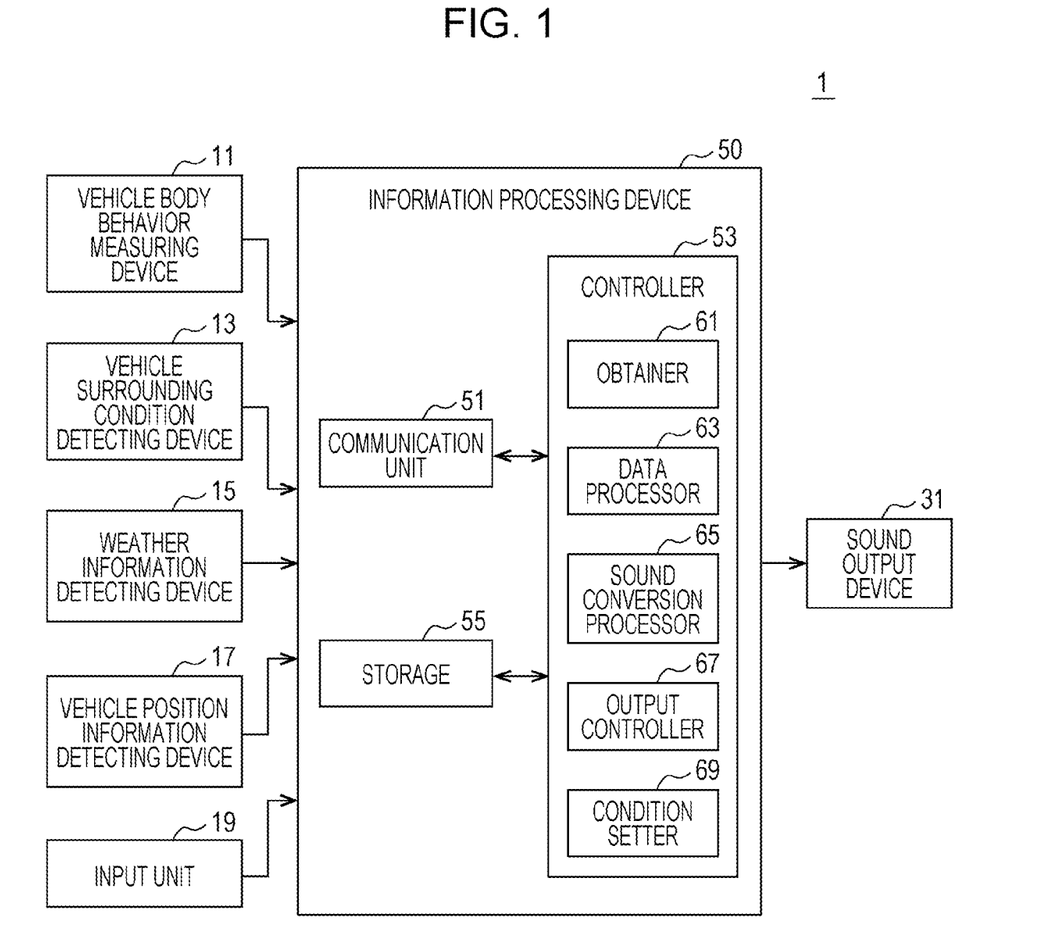
FIG. 1 is a block diagram illustrating an example of the configuration of a driving support apparatus according to an embodiment of the disclosure.

The configuration of a driving support apparatus 1 will be first discussed below. FIG. 1 is a block diagram illustrating an example of the configuration of the driving support apparatus 1 according to the embodiment.

The driving support apparatus 1 includes an information processing device 50. The information processing device 50 is constituted by a processor, such as a central processing unit (CPU), electric circuitry, and storage elements such as a random access memory (RAM) and a read only memory (ROM). The entirety or part of the information processing device 50 may be software that can be updated, such as firmware, or may be a program module that is executed in response to an instruction from the CPU.

The driving support apparatus 1 also includes a vehicle body behavior measuring device 11, a vehicle surrounding condition detecting device 13, a weather information detecting device 15, a vehicle position information detecting device 17, an input unit 19, and a sound output device 31. The vehicle body behavior measuring device 11, the vehicle surrounding condition detecting device 13, the weather information detecting device 15, the vehicle position information detecting device 17, the input unit 19, and the sound output device 31 are coupled to the information processing device 50 directly or via a communication bus, such as a controller area network (CAN), so that they can communicate with the information processing device 50.

(2-1. Vehicle Body Behavior Measuring Device)

The vehicle body behavior measuring device 11 measures data indicating behavior of a vehicle body. The vehicle body behavior measuring device 11 includes at least one of a vehicle velocity sensor, an acceleration sensor, or an angular velocity sensor. The vehicle velocity sensor detects the rotational speed of a drive shaft of the vehicle, for example. The acceleration sensor at least detects the longitudinal acceleration, which is the acceleration in the front-back direction of the vehicle body, and the lateral acceleration in the widthwise direction of the vehicle body. The acceleration sensor may also detect the vertical acceleration, which is the acceleration in the height direction of the vehicle body. The angular velocity sensor detects a rate of change of each of the longitudinal axial angle (roll angle) in the front-back direction of the vehicle body, the transverse axial angle (pitch angle) in the widthwise direction of the vehicle body, and the vertical axial angle (yaw angle) of the height direction of the vehicle body. The angular velocity sensor may be a yaw rate sensor that detects a rate of change of the yaw angle.

Data measured by the vehicle body behavior measuring device 11 is subject to change in response to steering, accelerating, and braking operations of a driver. The data is input into the information processing device 50 as vehicle body behavior data. The information processing device 50 is thus able to obtain information indicating data measured by the vehicle body behavior measuring device 11. The vehicle body behavior measuring device 11 may include a sensor other than a vehicle velocity sensor, an acceleration sensor, and an angular velocity sensor to measure data indicating behavior of the vehicle body.

(2-2. Vehicle Surrounding Condition Detecting Device)

The vehicle surrounding condition detecting device 13 detects information about the surrounding conditions of a vehicle. The vehicle surrounding condition detecting device 13 includes at least one of a stereo camera, a monocular camera, a light detection and ranging, laser imaging, detection, and ranging (LiDAR), or a radar sensor. The vehicle surrounding condition detecting device 13 detects objects around a vehicle, such as other vehicles, bicycles, pedestrians, road signs, and other obstacles, based on obtained data, and also detects the distance to such an object and the relative velocity of the object. The vehicle surrounding condition detecting device 13 also detects other surrounding conditions of a vehicle, such as the road width, based on the obtained data.

Information detected by the vehicle surrounding condition detecting device 13 is input into the information processing device 50. The information processing device 50 is thus able to obtain information detected by the vehicle surrounding condition detecting device 13. The vehicle surrounding condition detecting device 13 may include a device other than a stereo camera, a monocular camera, a LiDAR, and a radar sensor to detect the surrounding conditions of a vehicle.

(2-3. Weather Information Detecting Device)

The weather information detecting device 15 detects information about the weather in a driving area of a vehicle. The weather information detecting device 15 includes at least one of a stereo camera, a monocular camera, a rain sensor, an air pressure gauge, or an acceleration sensor. The weather information detecting device 15 can detect a rainfall, snowfall, accumulated snow, and icy road, for example, based on imaging data obtained by a stereo camera or a monocular camera. The weather information detecting device 15 can also estimate the amount of rainfall based on data obtained by a rain sensor. The weather information detecting device 15 can also detect the wind speed and direction based on data obtained by an air pressure gauge and can estimate the wind speed and direction based on a sensor signal output from an acceleration sensor.

Information detected by the weather information detecting device 15 is input into the information processing device 50. The information processing device 50 is thus able to obtain information detected by the weather information detecting device 15. The weather information detecting device 15 may include a device other than a stereo camera, a monocular camera, a rain sensor, an air pressure gauge, and an acceleration sensor to detect information about the weather in a driving area of a vehicle. The weather information detecting device 15 may receive information from an external system, such as telematics, so as to obtain information about the weather in the driving area of a vehicle. In this case, the information processing device 50 is also able to obtain information received from an external system.

(2-4. Vehicle Position Information Detecting Device)

The vehicle position information detecting device 17 receives a positioning signal transmitted from a global navigation satellite system (GNSS), which is a typical example of a global positioning system (GPS), and measures the position of the vehicle. The vehicle position information detecting device 17 may receive a positioning signal from another system, such as the quasi-zenith satellite system, in addition to or instead of the GNSS, and measure the position of the vehicle. Information about the position of the vehicle detected by the vehicle position information detecting device 17 is input into the information processing device 50. The information processing device 50 is thus able to obtain position information indicating the position of the vehicle detected by the vehicle position information detecting device 17.

(2-5. Input Unit)

The input unit 19 receives an input operation from a user and sends information about the input operation to the information processing device 50. The input unit 19 may be a touchscreen display or a dial-control operation device. The input unit 19 may be a voice recognition system that receives input of voice of a driver or a passenger or an image recognition system that receives input of a gesture of a driver or a passenger.

In the embodiment, the input unit 19 receives input of information about attributes of a driver. The information about attributes of a driver is information related to the driving skills of the driver and indicates at least one of the driver's age, how long the driver has driven after getting the license, how often the driver drives, or how long the driver has not driven since he/she did last time (blank period). Other information from which the driving skills of the driver can be estimated may be included. These items of information may be input by the driver answering questions in a form of a questionnaire presented by the information processing device 50. Alternatively, these items of information may be obtained and stored in advance and be input into the information processing device 50.

The input unit 19 may also receive input of information about a sound to be output. For example, a user driver may be able to select a desirable sound from various sound types or tones, such as musical instrument sounds and sound effects, presented by the information processing device 50. Sound data is stored in a storage 55 of the information processing device 50 and may be updated or added as a result of the driving support apparatus 1 communicating with an external server, for example.

(2-6. Sound Output Device)

The sound output device 31 outputs a sound that can be recognized by a driver. The sound output device 31 may be a speaker installed in the vehicle or a speaker dedicated to the driving support apparatus 1. The sound output device 31 outputs a sound under the control of the information processing device 50 and allows a driver to identify driver performance evaluation via auditory stimulation.

(2-7. Information Processing Device)

The information processing device 50 includes a communication unit 51, a controller 53, and a storage 55. The controller 53 includes an obtainer 61, a data processor 63, a sound conversion processor 65, an output controller 67, and a condition setter 69. The controller 53 is a processor, such as a CPU. The obtainer 61, the data processor 63, the sound conversion processor 65, the output controller 67, and the condition setter 69 may be functions implemented as a result of the processor executing a program.

(2-7-1. Storage)

The storage 55 includes one or multiple storage elements, such as a RAM and a ROM. The storage 55 stores obtained data and calculation result data, as well as a program executed by the controller 53 and various parameters used for executing the program.

(2-7-2. Communication Unit)

The communication unit 51 is an interface for sending and receiving data and signals to and from the vehicle body behavior measuring device 11, the vehicle surrounding condition detecting device 13, the weather information detecting device 15, the vehicle position information detecting device 17, the input unit 19, and the sound output device 31.

(2-7-3. Obtainer)

The obtainer 61 of the controller 53 obtains information output from the vehicle body behavior measuring device 11, the vehicle surrounding condition detecting device 13, the weather information detecting device 15, the vehicle position information detecting device 17, and the input unit 19 via the communication unit 51. An example of information obtained by the obtainer 61 is data indicating behavior of the vehicle body output from the vehicle body behavior measuring device 11. The obtainer 61 obtains data at predetermined intervals and stores the obtained data in the storage 55.

(2-7-4. Data Processor)

The data processor 63 of the controller 53 executes certain data processing on vehicle body behavior data obtained by the obtainer 61. In one example, the data processor 63 executes at least one of smoothing processing, absolute value conversion processing, or time derivative processing on measurement data indicating at least one of the vehicle velocity, acceleration (longitudinal acceleration, lateral acceleration, and vertical acceleration), or angular velocity (angular velocity of yaw angle, roll angle, and pitch angle), so as to calculate an evaluation value, which is a value representing the magnitude of the behavior of the vehicle body.

For example, the data processor 63 executes smoothing processing, absolute value conversion processing, and time derivative processing on measurement data indicating at least one of the vehicle velocity, acceleration, or angular velocity so as to calculate the absolute value of at least one of the acceleration, a jerk (snap or jounce), or a jerk of angular velocity (which is also called angular acceleration). The calculated absolute value of at least one of the acceleration, angular velocity, a jerk, or angular acceleration may be used as the evaluation value. Among others, using the absolute value of at least one of a jerk or angular acceleration as the evaluation value can reduce the influence of a route of the vehicle, acceleration and deceleration of another vehicle on a change in the vehicle velocity, acceleration, or angular velocity. This makes it possible to more accurately evaluate a change of the behavior of the vehicle body based on the driver performance.

The data processor 63 may calculate one evaluation value by using plural items of data selected from the absolute values of acceleration, angular velocity, a jerk, and angular acceleration. In this case, the data processor 63 may convert individual items of data to be used to values represented by the same index (index value of 0 to 100, for example) and determine the average of the index values as the evaluation value. In the embodiment, the data processor 63 uses the number (type) of data which is set by the condition setter 69 based on driving conditions of the vehicle and calculates the evaluation value. Details of setting of items of data by the condition setter 69 will be discussed later.

Regarding the acceleration and a jerk, the evaluation value is calculated for each of at least one of the longitudinal acceleration, lateral acceleration, or vertical acceleration. Regarding the angular velocity and angular acceleration, the evaluation value is calculated for each of at least one of the yaw angle, roll angle, or pitch angle. The evaluation value calculated by the data processor 63 is larger as the magnitude of the behavior of the vehicle body is greater, and is smaller as the magnitude of the behavior of the vehicle body is smaller.

(2-7-5. Sound Conversion Processor)

The sound conversion processor 65 of the controller 53 converts the evaluation value calculated by the data processor 63 into information indicating a sound to be output. The sound conversion processor 65 determines a region where an output sound is sequentially changed, based on the upper limit value set by the condition setter 69, and then converts the evaluation value into information indicating an output sound. In one example, the region where an output sound is sequentially changed in response to variations of the evaluation value (hereinafter such a region may also be called an output sound variation region) becomes different depending on the upper limit value set by the condition setter 69. The lower limit value of the output sound variation region may be zero or a positive value. The sound conversion processor 65 first determines an element of an output sound that is sequentially changed in response to variations of the evaluation value (hereinafter such an element may also be called a variation element). Then, in accordance with the output sound variation region determined based on the upper limit value set by the condition setter 69, the sound conversion processor 65 allocates changing evaluation values to corresponding levels of the element so as to set the output sound reflecting the changing evaluation values. The variation element of the output sound may be at least one of the pitch, frequency, volume, tempo, or the number of sound tones. However, the variation element is not limited to these examples.

The state in which the output sound is sequentially changed in accordance with variations of the evaluation value is the following state. A variation element of the output sound is the pitch, frequency, volume, tempo, or the number of sound tones, for example. Changing evaluation values are allocated to multiple levels of the pitch, frequency, volume, or tempo of the output sound, or multiple sound tones so that the variation element is varied progressively or non-progressively in accordance with the magnitude of the evaluation value, and then, a sound corresponding to the calculated evaluation value is output. The state in which a sound is continuously output is a state in which the sound continues to be output regardless of whether the sound is sequentially changed or is a fixed, flat sound.

In the embodiment, if the evaluation value is within the output sound variation region, a sound continuously output from the sound output device 31 is sequentially changed in accordance with variations of the evaluation value. For example, if the output sound is a sound of a musical instrument having a scale, the pitch of the output sound is set to be sequentially and progressively increased as the evaluation value becomes larger. If the output sound is not a sound of a musical instrument or is a sound of a musical instrument without a scale, the frequency of the output sound may be set to be increased sequentially and non-progressively as the evaluation value becomes larger. Alternatively, the volume of the output sound may be set to be sequentially louder or the tempo of the output sound may be set to be sequentially quicker as the evaluation value becomes larger. The number of sound tones to be generated as the output sound may be set to be sequentially and progressively decreased as the evaluation value becomes larger. This allows a driver to intuitively recognize a change in the level of the stability of the behavior of the vehicle body. In one example, if, as the evaluation value becomes larger, the pitch or the frequency of the output sound is set to be higher, the volume is set to be louder, the tempo is set to be quicker, or the number of sound tones to be generated is set to be smaller, the driver can highly intuitively recognize that the behavior stability of the vehicle body is decreasing.

If the evaluation value is greater than or equal to the upper limit value, predetermined control is executed. In the embodiment, if the evaluation value is greater than or equal to the upper limit value, sound continuously output from the sound output device 31 is set to be a fixed, flat sound. For example, if the pitch or the frequency of the output sound is set to become higher as the evaluation value becomes larger within the output sound variation region, when the evaluation value is greater than or equal to the upper limit value, the pitch or the frequency of the output sound may be fixed to the highest pitch level or the highest frequency among the pitch levels or frequencies that are sequentially changed. Likewise, if the volume of the output sound is set to become louder as the evaluation value becomes larger within the output sound variation region, when the evaluation value is greater than or equal to the upper limit value, the volume of the output sound may be fixed to the highest level among the volume levels that are sequentially changed. Alternatively, if the tempo of the output sound is set to become quicker as the evaluation value becomes larger within the output sound variation region, when the evaluation value is greater than or equal to the upper limit value, the tempo of the output sound may be fixed to the quickest level among the tempo levels that are sequentially changed. Likewise, if the number of sound tones is set to be decreased as the evaluation value becomes larger within the output sound variation region, when the evaluation value is greater than or equal to the upper limit value, the number of sound tones may be fixed to the smallest number among the numbers of sound tones that are sequentially changed. Then, the driver is able to intuitively recognize that the behavior stability of the vehicle body is low.

In the embodiment, if the lower limit value of the output sound variation region is set to be greater than zero, when the evaluation value is smaller than or equal to the lower limit value, sound continuously output from the sound output device 31 is set to be a fixed, flat sound. For example, if the pitch or the frequency of the output sound is set to become higher as the evaluation value becomes larger within the output sound variation region, when the evaluation value is smaller than or equal to the lower limit value, the pitch or the frequency of the output sound may be fixed to the lowest pitch level or frequency among the pitch levels or frequencies that are sequentially changed. Likewise, if the volume of the output sound is set to become louder as the evaluation value becomes larger within the output sound variation region, when the evaluation value is smaller than or equal to the lower limit value, the volume of the output sound may be fixed to the lowest level among the volume levels that are sequentially changed. Alternatively, if the tempo of the output sound is set to become quicker as the evaluation value becomes larger within the output sound variation region, when the evaluation value is smaller than or equal to the lower limit value, the tempo of the output sound may be fixed to the slowest level among the tempo levels that are sequentially changed. Likewise, if the number of sound tones of the output sound is set to be decreased as the evaluation value becomes larger within the output sound variation region, when the evaluation value is smaller than or equal to the lower limit value, the number of sound tones may be fixed to the largest number among the numbers of sound tones that are sequentially changed. Then, the driver is able to intuitively recognize that the behavior stability of the vehicle body is high.

The output sound may be a single tone or a single type, or may be a chord consisting of different sound pitch levels, tones, or types. For example, the number of tones or types of output sound may be increased and decreased in accordance with an increase or a decrease in data types used for evaluating the magnitude of the behavior of the vehicle body. If plural data types are used to evaluate the magnitude of the behavior of the vehicle body, an evaluation value may be calculated for each data type and a sound corresponding to each evaluation value may be output. In this case, sounds corresponding to the individual evaluation values may have the same tone or type or different tones or types. When a chord is used as the output sound, by changing the pitch levels, tones, or the number of notes forming the chord, a sound that makes a driver comfortable can be output, and a sound that makes the driver uncomfortable can also be output.

The sound conversion processor 65 sets the output sound variation region in accordance with the upper limit value set by the condition setter 69, and allocates changing evaluation values within the output sound variation region to corresponding levels of a variation element. For example, if the output sound is a sound of a musical instrument having a scale, the sound conversion processor 65 allocates each evaluation value to a corresponding note of the scale of the musical instrument. It is now assumed that a piano sound is used as the output sound. In this case, if the evaluation value is in a region lower than or equal to the lower limit value of the output sound variation region, the sound conversion processor 65 sets the pitch level of the output sound to be the lowest note of the scale. If the evaluation value is in a region higher than or equal to the upper limit value of the output sound variation region, the sound conversion processor 65 sets the pitch level of the output sound to be the highest note of the scale. If the evaluation value is within the output sound variation region, the sound conversion processor 65 allocates each evaluation value within the output sound variation region to the note of a corresponding piano key between the lowest note and the highest note of the scale.

If a sound effect without a scale is selected as the output sound, the sound conversion processor 65 sets a frequency range within the human hearing range (about 20 to 20000 Hz) as a variation element of the output sound, and allocates each evaluation value to a corresponding frequency in this range. In this case, each evaluation value is allocated to a corresponding frequency in a similar manner to when the output sound is a musical instrument sound. If the evaluation value is in a region lower than or equal to the lower limit value of the output sound variation region, the sound conversion processor 65 sets the frequency of the output sound to be the lowest frequency of the range. If the evaluation value is in a region higher than or equal to the upper limit value of the output sound variation region, the sound conversion processor 65 sets the frequency of the output sound to be the highest frequency of the range. If the evaluation value is within the output sound variation region, the sound conversion processor 65 non-progressively allocates each evaluation value to the corresponding frequency between the lowest frequency and the highest frequency of the range.

In addition to or instead of changing the pitch level or the frequency of the output sound, the volume, tempo, or the number of sound tones of the output sound may be changed. In this case, too, the sound conversion processor 65 allocates each evaluation value to a corresponding level of the variation element progressively or non-progressively.

In some examples, the range by which the variation element is sequentially varied in the output sound variation region, that is, the amount by which the pitch or the frequency, volume, tempo, or the number of sound tones is changed, is the same regardless of the level of the upper limit value. That is, in some examples, the range by which the variation element of the output sound is varied is fixed regardless of the width of the output sound variation region. This allows a driver to intuitively recognize how close the magnitude of the behavior of the vehicle body is approaching the current upper limit value, regardless of the width of the output sound variation region. In this case, as the output sound variation region is narrower, the output sound is varied more precisely in response to a slight change in the behavior of the vehicle body. This allows the driver to recognize even a slight change in the behavior of the vehicle body.

As described above, the sound conversion processor 65 sets a sound tone or a sound type selected by a user, such as driver, to an output sound, and also allocates each evaluation value calculated by the data processor 63 to a corresponding level of the variation element of the output sound in accordance with the output sound variation region, thereby setting the output sound corresponding to the evaluation value calculated by the data processor 63. As a result, the evaluation value calculated by the data processor 63 can be converted into information indicating the output sound.

(2-7-6. Output Controller)

The output controller 67 of the controller 53 controls the driving of the sound output device 31, based on information indicating the output sound calculated by the sound conversion processor 65, and drives the sound output device 31 to issue the output sound. In the embodiment, the output controller 67 causes the sound output device 31 to output a sound tone or a sound type set by the sound conversion processor 65 in accordance with a variation element of the output sound, such as the pitch, frequency, volume, tempo, or the number of tones.

(2-7-7. Condition Setter)

The condition setter 69 of the controller 53 sets a condition for sound conversion processing to be executed by the sound conversion processor 65. The condition setter 69 sets the upper limit value which determines the output sound variation region, based on driving conditions of a vehicle. In the embodiment, the conditions setter 69 sets the upper limit value, based on information about driver's attributes input via the input unit 19 and driving environments which influence the behavior stability of the vehicle body as the driving conditions. In one example, based on information related to driver's driving skills estimated from the information about driver's attributes, the condition setter 69 sets a smaller upper limit value as the driving skills estimated from the driver's attributes are higher and sets a larger upper limit value as the driving skills are lower. With this setting, for a driver having high driving skills to make the behavior of the vehicle body stable, the upper limit value is lowered. This allows this driver to recognize even a slight change in the behavior of the vehicle body compared with a driver having lower driving skills. This can induce the driver having high driving skills to improve driver performance so that the behavior of the vehicle body can be more stable. Conversely, for a driver having low driving skills, the upper limit value is raised. This can induce this driver to drive at a suitably stable level in accordance with his/her driving skills.

As the information about driver's attributes related to driver's driving skills, at least one of the driver's age, how long the driver has driven after getting the license, how often the driver drives, or how long the driver has not driven since he/she did last time (blank period), which is obtained via the input unit 19, is used. If the driver's age is high, the driving skills are likely to have deteriorated, and the upper limit value is increased. As the time after the driver has obtained the license is longer, the driving skills are likely to be higher, and the upper limit value is decreased. As the driver drives more frequently, the driving skills are likely to be higher, and the upper limit value is decreased. As the time after the driver drove last time (blank period) is longer, the driving skills are more likely to have deteriorated, and the upper limit value is raised.

In addition to the information obtained via the input unit 19, the condition setter 69 may use data about the past evaluation values of the driver to adjust the upper limit value. For example, the condition setter 69 may use information about the number of times or the frequency with which the evaluation value calculated by the data processor 63 exceeds the upper limit value during the past driving time of this driver. In this case, as the number of times or the frequency with which the evaluation value exceeds the upper limit value is smaller, the driving skills of this driver are likely to be higher, and the upper limit value is lowered.

The condition setter 69 may also set the upper limit value based on driving environments which influence the behavior stability of the vehicle body. For example, the condition setter 69 sets a smaller upper limit value in a driving environment where a high behavior stability is expected because the road traffic seems more dangerous. Conversely, the condition setter 69 sets a larger upper limit value in a driving environment where the road traffic seems less dangerous. With this setting, in a driving environment where the road traffic seems more dangerous, the driver can be induced to drive safely so that the behavior of the vehicle body can be stable.

An example of the driving environment where the road traffic seems more dangerous is a driving scene where the risk of having an accident is higher in terms of traffic safety. Examples of such a driving scene are scenes where there are many pedestrians and bicycles, where the car traffic is heavy, where a vehicle drives in a school road during the commuting time, and where a vehicle drives in a narrow road. The condition setter 69 may be able to judge whether the vehicle is driving in such an environment, based on information about the surrounding conditions of the vehicle input from the vehicle surrounding condition detecting device 13, position information of the vehicle detected by the vehicle position information detecting device 17, and map data of the navigation system.

In one example, the condition setter 69 can identify a scene where there are many pedestrians and bicycles or a scene where the car traffic is heavy, based on the number of pedestrians and bicycles or that of vehicles detected from the surrounding condition information input from the vehicle surrounding condition detecting device 13. The condition setter 69 can identify a scene where a vehicle drives in a school road during the commuting time, based on information about road signs detected from the surrounding condition information input from the vehicle surrounding condition detecting device 13, position information of the vehicle detected by the vehicle position information detecting device 17, and map data and time information of the navigation system. The condition setter 69 can identify a scene where the vehicle drives in a narrow road, based on the road width detected from the surrounding condition information input from the vehicle surrounding condition detecting device 13.

Regarding the driving environments which influence the behavior stability of the vehicle body, the condition setter 69 may set a smaller upper limit value in a driving environment where the behavior stability is likely to be decreased, and may set a larger upper limit value in a driving environment where the behavior stability is less likely to be decreased. With this setting, in a driving environment where the behavior stability is likely to be decreased, the driver can be induced to drive safely so that the behavior of the vehicle body becomes stable. An example of the driving environment where the behavior stability is likely to be decreased is a driving scene where the risk of having an accident becomes high due to a weather environment. Examples of such an environment are a heavy rainfall, heavy snowfall, storm, accumulated snow, and icy road. The condition setter 69 can predict a driving environment where the behavior stability is likely to be decreased due to a weather condition, based on information about the weather in a driving area of the vehicle detected by the weather information detecting device 15.

In the embodiment, the condition setter 69 sets a condition for data processing to be executed by the data processor 63, based on at least one of the above-described information about driver's attributes or information about driving environments of the vehicle. In one example, based on at least one of the information about driver's attributes or information about driving environments of the vehicle, the condition setter 69 sets the number of data types to be used by the data processor 63 to calculate the evaluation value representing the magnitude of the behavior of the vehicle body.

For example, as the driving skills which can be estimated from the driver's attributes are higher, the condition setter 69 increases the number of data types used for calculating the evaluation value, and as the driving skills are lower, the condition setter 69 decreases the number of data types. With this setting, for a driver having high driving skills to make the behavior of the vehicle body stable, driver performance is evaluated based on more data types. This can induce this driver to improve driver performance so that the behavior of the vehicle body can be more stable. Conversely, for a driver having low driving skills, driver performance is evaluated based on fewer data types. This can induce this driver to drive at a suitably stable level in accordance with his/her driving skills.

The condition setter 69 also sets more data types used for calculating the evaluation value when the vehicle is in an environment where a higher behavior stability is expected or where the behavior stability is more likely to be decreased. With this setting, driver performance can be evaluated based on more data types when the vehicle is driving in an environment where a higher behavior stability is expected because the road traffic seems dangerous. This can induce this driver to drive safely so that the behavior of the vehicle body can be more stable. Driver performance can also be evaluated based on more data types when the behavior stability is likely to be decreased due to a heavy rainfall or snowfall or a storm, for example. This can induce this driver to drive safely so that the behavior of the vehicle body can be stable.

In this manner, the condition setter 69 may adjust the number of data types to be used for calculating the evaluation value by the data processor 63. Even in this case, regardless of the number of data types to be used, the use of data about a jerk of lateral acceleration or the angular acceleration of yaw angle is prioritized. This makes it easier to evaluate the steering operation of a driver. The use of data about a jerk of longitudinal acceleration or the angular acceleration of roll angle may be prioritized. This makes it easier to evaluate the accelerating and braking operation of a driver.

Figure 2:
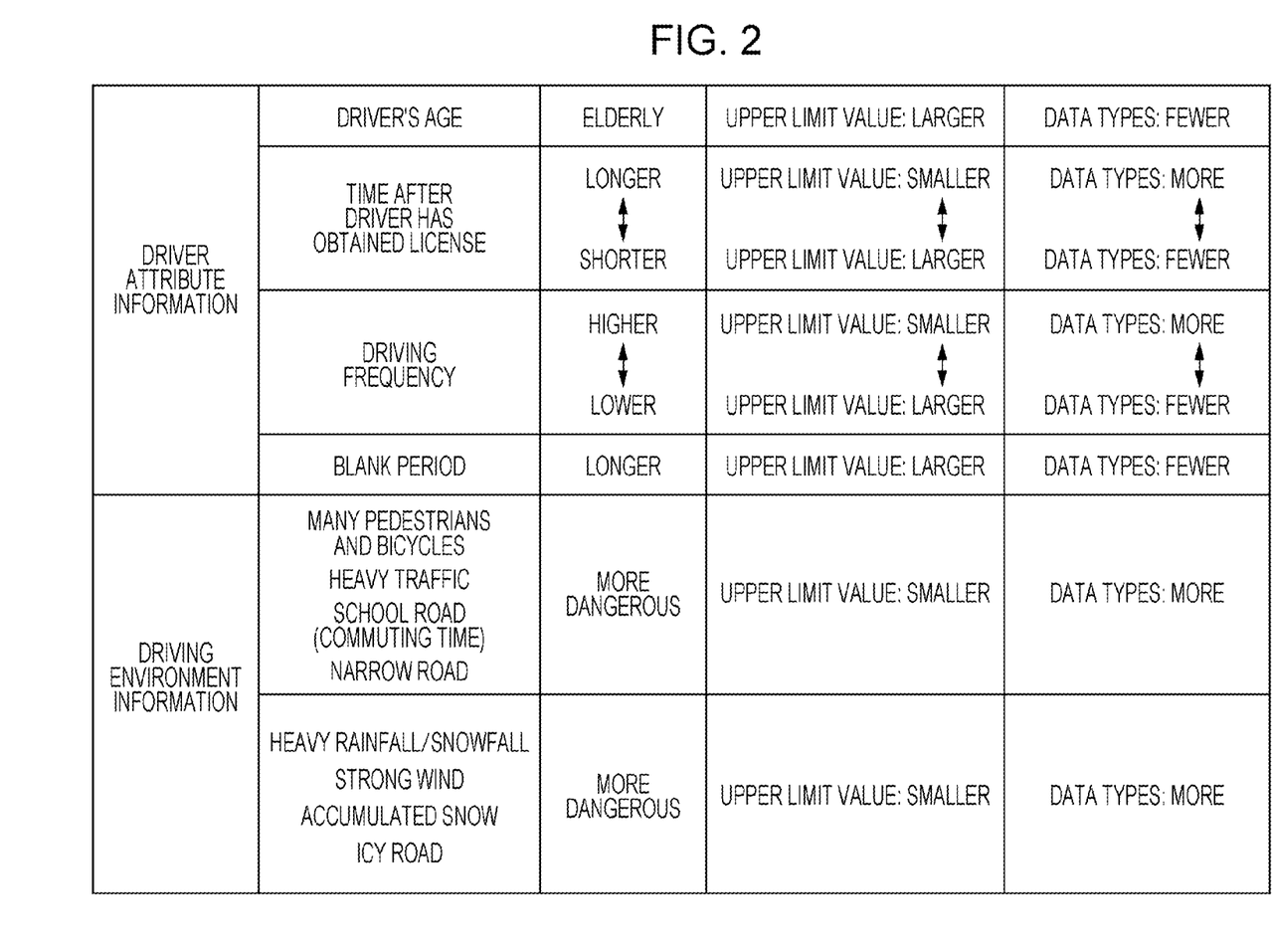
FIG. 2 illustrates an example of an approach to setting conditions by the driving support apparatus of the embodiment.

FIG. 2 illustrates examples of the approach to setting the upper limit value and to adjusting the number of data types used for calculating an evaluation value, based on information about driver's attributes and information about driving environments that influence the behavior stability of the vehicle body.

As is seen from FIG. 2, concerning the information about driver's attributes, when the driver's age exceeds a preset age (when the driver is elderly), the upper limit value of the evaluation value is increased by a preset number and the number of data types used for calculating the evaluation value is decreased. FIG. 2 also indicates that, as the time after the driver has obtained the license is longer, the upper limit value becomes smaller by a preset number and the number of data types used for calculating the evaluation value becomes larger. Conversely, as the time after the driver has obtained the license is shorter, the upper limit value becomes larger by a preset number and the number of data types used for calculating the evaluation value becomes smaller.

As the driver drives more frequently, the upper limit value becomes smaller by a preset number and the number of data types used for calculating the evaluation value becomes larger. Conversely, as the driver drives less frequently, the upper limit value becomes larger by a preset number and the number of data types used for calculating the evaluation value becomes smaller. As the time after the driver drove last time (blank period) is longer, the upper limit value becomes larger by a preset number and the number of data types used for calculating the evaluation value becomes smaller.

Regarding the information about driving environments of a vehicle, in scenes where there are many pedestrians and bicycles, where the car traffic is heavy, where a vehicle drives in a school road during the commuting time, and where a vehicle drives in a narrow road, it is desirable to raise the stability of the behavior of the vehicle body. Hence, the upper limit value is decreased by a preset number and the number of data types used for calculating the evaluation value is increased. In an environment of a heavy rainfall or snowfall, strong wind, accumulated snow, or icy road, the behavior stability is likely to be decreased. Hence, the upper limit value is decreased by a preset number and the number of data types used for calculating the evaluation value is increased.

The condition setter 69 increases or decreases a reference value, which is set for the upper limit value, and a reference value, which is set for the number of data types, based on the information about driver's attributes and the information about driving environments. For example, if the evaluation value is calculated as the index value of 0 to 100, the reference value of the upper limit value may be set to be 50, and then, the upper limit value may be calculated by adding or subtracting 10 to or from the reference value, based on the information about driver's attributes and the information about driving environments. The data types that can be used for evaluating the behavior stability may be set to be twelve items of data, such as the longitudinal acceleration, lateral acceleration, vertical acceleration, angular velocity of yaw angle, that of roll angle, that of pitch angle, a jerk of longitudinal acceleration, that of lateral acceleration, that of vertical acceleration, angular acceleration of yaw angle, that of pitch angle, and that of roll angle. Then, the number of data types used as the reference value is set to be five and is increased or decreased one by one, based on the information about driver's attributes and the information about driving environments. The upper limit value and the number of data types are adjusted within a range between a preset maximum value and a preset minimum value of the upper limit value and that of the number of data types. As a result, a condition for data processing to be executed by the data processor 63 and that for sound conversion processing to be executed by the sound conversion processor 65 are set.

The amount by which the upper limit value is increased or decreased and the number by which data types are increased or decreased may be fixed regardless of the driver's attributes and the driving environments or may be weighted in accordance with the driver's attributes and the driving environments.

Data processing, sound conversion processing, and condition setting processing executed by the controller 53 will be described below with reference to FIGS. 3 through 5 through illustration of an example.

Figure 3:
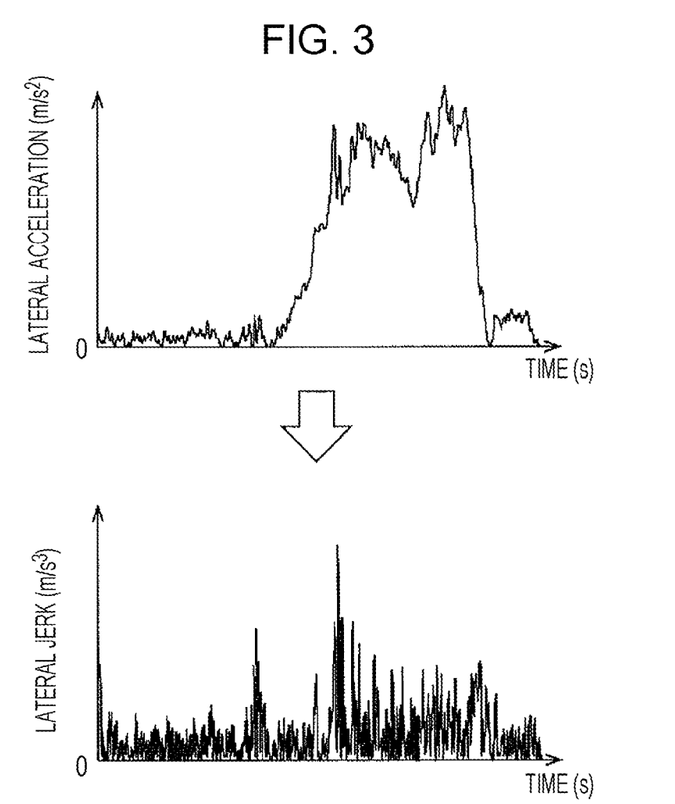
FIG. 3 is graphs illustrating an example of data processing executed by the driving support apparatus of the embodiment.
Figure 4:
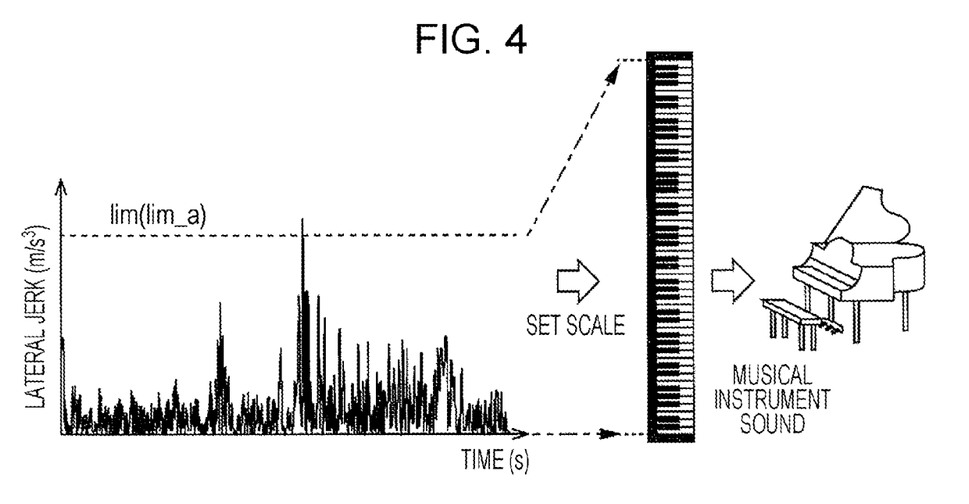
FIG. 4 is a graph illustrating an example of sound conversion processing executed by the driving support apparatus of the embodiment.

FIG. 3 is graphs illustrating an example of data processing executed by the data processor 63, and FIG. 4 is a graph illustrating sound conversion processing executed by the sound conversion processor 65. In the example in FIGS. 3 and 4, the value of a jerk of lateral acceleration (lateral jerk)

determined from measurement data of the lateral acceleration detected by an acceleration sensor, which forms the vehicle body behavior measuring device 11, is used as the evaluation value, and a scale of piano sounds to be output is set based on the evaluation value. In the example in FIG. 4, the lower limit value of the output sound variation region in which the output sound is sequentially changed in response to variations of the evaluation value is set to be zero.

As illustrated in FIG. 3, the data processor 63 executes smoothing processing and absolute value conversion processing on the measurement data of the lateral acceleration so as to convert the lateral acceleration into the absolute value thereof. The data processor 63 then executes time derivative processing to convert the lateral acceleration into the absolute value of a jerk of lateral acceleration (lateral jerk).

As illustrated in FIG. 4, the sound conversion processor 65 sets the pitch of the output sound in accordance with the absolute value of the jerk of lateral acceleration (evaluation value). In one example, the sound conversion processor 65 allocates changing evaluation values to corresponding sound notes of a preset scale in the following manner. When the evaluation value is smaller than the upper limit value lim set by the condition setter 69, as the evaluation value is larger, the sound pitch becomes higher within the range of the preset scale. That is, the sound conversion processor 65 allocates the evaluation value of 0 to the lowest note of the scale and the evaluation value of the upper limit value lim to the highest note of the scale, and then allocates the individual evaluation values between zero and the upper limit value lim to corresponding sound notes of the scale. The sound conversion processor 65 also allocates all evaluation values higher than or equal to the upper limit value lim to the highest note.

Then, the sound conversion processor 65 sets the tone of the output sound to piano sounds, and also sets the pitch levels of the output sound to corresponding sound notes of the scale in accordance with the changing absolute values of the jerk of lateral acceleration. As a result, piano sounds are output with the pitch levels corresponding to the changing evaluation values which reflect the behavior of the vehicle body. As a result, a change in the behavior of the vehicle body is output as a change in the sound, thereby enabling a driver to identify driver performance evaluation in real time during driving without being seriously distracted from driving.

The pitch of the output sound changes differently depending on the upper limit value. This will be explained below with reference to FIGS. 4 and 5. FIG. 5 is a graph illustrating an example in which the upper limit value is decreased in accordance with the driver's driving skills. FIG. 4 illustrates the absolute value of a jerk of lateral acceleration obtained from the performance of a driver having low driving skills. FIG. 5 illustrates the absolute value of a jerk of lateral acceleration obtained from the performance of a driver having high driving skills. The upper limit value lim_a in FIG. 5 corresponds to the upper limit value lim in FIG. 4.

As illustrated in FIG. 4, regarding the performance of the driver having low driving skills, the absolute value of a jerk of lateral acceleration (evaluation value) is relatively large, and the upper limit value lim_a is set to be a relatively large value. In this case, within the range of a preset scale, the sound conversion processor 65 allocates the evaluation value of 0 to the lowest note of the scale and the evaluation value of the upper limit value lim_a to the highest note of the scale, and then allocates the changing evaluation values between zero and the upper limit value lim_a to corresponding sound notes.

Figure 5:
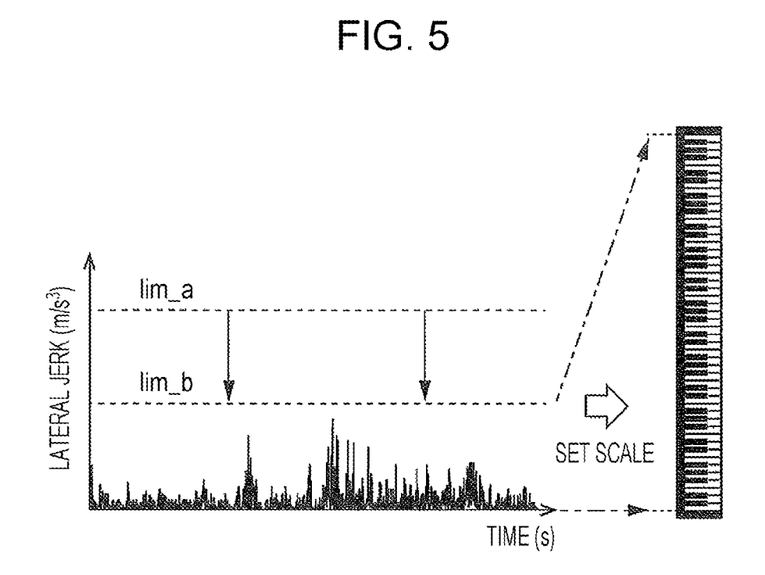
FIG. 5 is a graph illustrating an example in which output sound is changed as a result of adjusting a threshold.

As illustrated in FIG. 5, regarding the performance of a driver having high driving skills, the absolute value of a jerk of lateral acceleration (evaluation value) is relatively small, and the upper limit value lim_b is set to be a relatively small value. As in the case of FIG. 4, within the range of a preset scale, the sound conversion processor 65 allocates the evaluation value of 0 to the lowest note of the scale and the evaluation value of the upper limit value lim_b to the highest note, and then allocates the changing evaluation values between zero and the upper limit value lim_b to corresponding sound notes.

Regardless of the level of the upper limit value to be set, such as the upper limit value lim_a or lim_b, the range of a scale and the number of notes of the scale as a variation element are set to be uniform. With this setting, as the output sound variation region is narrower, the output sound can be changed more precisely in response to a slight change in the jerk of lateral acceleration. Hence, as the behavior stability of the vehicle body is higher, the driver can recognize a slighter change in the behavior of the vehicle body. This can induce the driver to improve driver performance so that the behavior of the vehicle body can be more stable.

In the output sound variation region, the range between the lower limit value (zero) and the upper limit value lim_a or lim_b of the evaluation values may be divided at equal intervals by the number of sound notes forming the scale so that the intervals of the evaluation values may be formed uniformly. Alternatively, the intervals of the evaluation values obtained in the above-described manner may be made different. For example, the interval of the evaluation values in a region near the lower limit value may be set to be larger, while that in a region near the upper limit value may be set to be smaller. With this setting, the output sound corresponding to the evaluation values in the region near the lower limit value is changed less precisely than that in the region near the upper limit value.

Conversely, the interval of the evaluation values in the region near the lower limit value may be set to be smaller. This enables the driver to recognize a slight change in the behavior of the vehicle body in this region. When the upper limit value is set to be a small value, such as the upper limit value lim_b, the pitch of the output sound is varied by a greater amount even if the evaluation value is not changed considerably than when the upper limit value is set to be a large value, such as the upper limit value lim_a. Additionally, when the upper limit value is set to be a small value, such as the upper limit value lim_b, the pitch of the output sound is fixed to the highest note of the scale at a smaller evaluation value than that when the upper limit value is set to be a large value, such as the upper limit value lim_a. This can induce a driver having high driving skills to improve driver performance so that the behavior of the vehicle body can be more stable.

When the upper limit value lim_a or lim_b is set in accordance with the danger level of a driving environment, a smaller upper limit value, such as the upper limit value lim_b, is set as the driving environment is found to be more dangerous. This can induce a driver to improve driver performance so that the behavior of the vehicle body can be more stable. The driver thus tries to drive more carefully to avoid an accident and not to make people around the vehicle feel danger or frightened.

When setting the output sound variation region, the condition setter 69 may set a lower limit value as well as an upper limit value. That is, the lower limit value of a range in which sound is sequentially changed in response to variations of the evaluation value may be other than zero. For example, a slight wobble occurs in the vehicle body regardless of the driving skills of a driver. Accordingly, the lower limit value may be set to be a value exceeding zero, and the output sound may be sequentially changed within a predetermined range in which the evaluation value becomes greater than or equal to the lower limit value. In this case, when the evaluation value becomes lower than the lower limit value, outputting of sound may be stopped. This lets the driver know that the behavior of the vehicle body has become unstable to a degree more than a normal wobble.

When a vehicle drives in a school road during the commuting time, the condition setter 69 may change the tone or type of output sound to a tone or type that makes the driver feel uncomfortable. The tone or type that makes the driver feel uncomfortable may be a preset sound that the driver does not like. Alternatively, while a chord consisting of different pitch levels is set as a regular output sound, only a single sound may be output when a vehicle drives in a school road during the commuting time. This can induce the driver to avoid driving in the school road.

The driving environment in which a sound tone or type that makes a driver feel uncomfortable is output is not limited to driving in a school road. For example, in a driving environment where the road traffic seems dangerous, such as in an environment where a vehicle drives in a crowded shopping district, the condition setter 69 may change the tone or type of output sound to a tone or type that makes the driver feel uncomfortable. The condition setter 69 may identify such a driving environment, based on position information input from the vehicle position information detecting device 17 and map data and time information of the navigation system or based on the number of pedestrians or bicycles estimated from data detected by the vehicle surrounding condition detecting device 13.

In a driving environment where the behavior stability of the vehicle body is likely to be lowered, the condition setter 69 may stop outputting sound. For example, in a scene where a vehicle drives on an unpaved road, such as a gravel path, or a scene where a vehicle drives by avoiding other vehicles in traffic congestion, the behavior stability is likely to become lower regardless of the driver's driving skills. The condition setter 69 thus stops outputting sound. This can prevent an inaccurate evaluation from being presented to a driver and also avoid leading a driver to drive unsuitably based on such an inaccurate evaluation. A driving environment where the behavior stability of the vehicle body is likely to be lowered can be specified from the condition of a driving road surface or the number of other vehicles in the driving road that can be estimated based on data detected by the vehicle surrounding condition detecting device 13. An unpaved road may be detected from a change in the acceleration in the vertical direction of the vehicle body indicated by measurement data input from the vehicle body behavior measuring device 11.

3. Operation of Driving Support Apparatus

Figure 6:
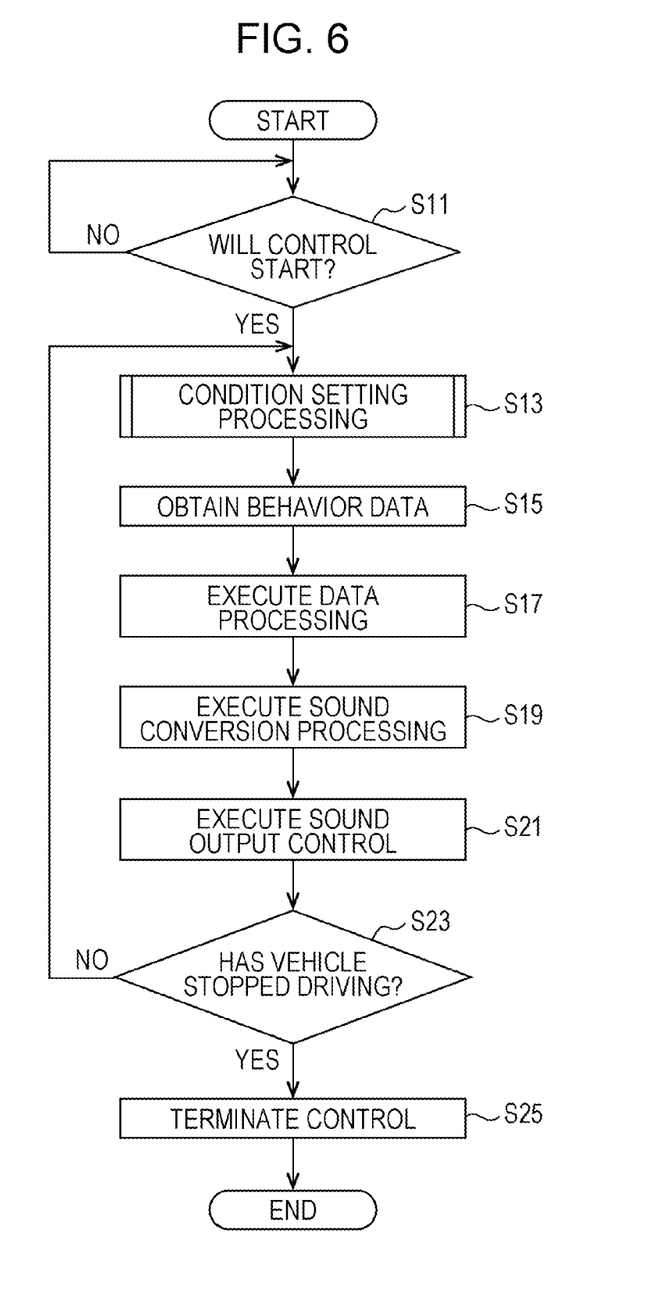
FIG. 6 is a flowchart illustrating control processing executed by the driving support apparatus of the embodiment.
Figure 7:
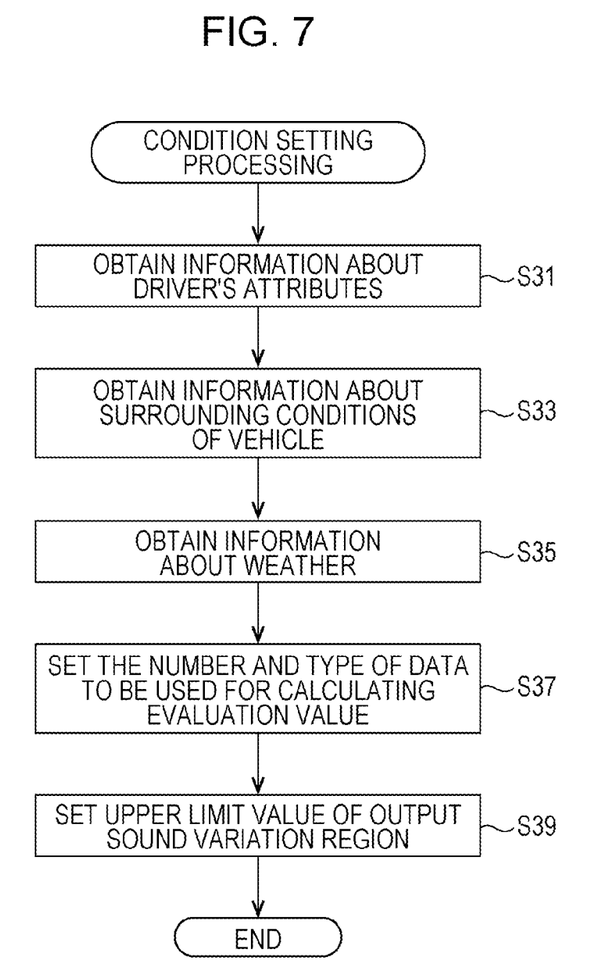
FIG. 7 is a flowchart illustrating condition setting processing executed by the driving support apparatus of the embodiment.

As the operation of the driving support apparatus 1 of the embodiment, an example of control processing executed by the information processing device 50 will be discussed below. FIG. 6 is a flowchart illustrating a main routine of control processing executed by the controller 53 of the information processing device 50. FIG. 7 is a flowchart illustrating a routine of condition setting processing executed by the controller 53.

In step S11, the controller 53 judges whether to start control processing for presenting driver performance evaluation to a driver via auditory stimulation. Hereinafter, such control processing may also be called auditory stimulation control. There is no particular restriction on a condition for starting to execute auditory stimulation control. In one example, if it is determined that auditory stimulation control is constantly executed while a driving system for the vehicle is operating, the controller 53 may judge that auditory stimulation control will start when the driving system is started. In another example, the controller 53 may judge that auditory stimulation control will start when it is detected that a driver has sat in the driver's seat based on an output signal from an in-vehicle imaging camera or a load sensor installed in the driver's seat. If a driver or a passenger is able to switch auditory stimulation control between ON and OFF, the controller 53 may judge that auditory stimulation control will start when a driver or a passenger has switched auditory stimulation control ON.

If the controller 53 has judged that auditory stimulation control will not start (NO in step S11), the controller 53 repeatedly executes step S11. If the controller 53 has judged that auditory stimulation control will start (YES in step S11), the controller 53 executes condition setting processing in step S13.

Condition setting processing will be discussed below in detail with reference to FIG. 7. In step S31, the obtainer 61 obtains information about driver's attributes sent from the input unit 19. For example, the obtainer 61 obtains at least one of the items of information about the driver's age, how long the driver has driven after getting the license, how often the driver drives, or how long the driver has not driven since he/she did last time (blank period). These items of information may be input by the driver responding to questions in a form of a questionnaire presented by the information processing device 50. Alternatively, these items of information may be obtained and stored in advance and be input into the information processing device 50. The obtainer 61 may also obtain evaluation data about the past performance of this driver from the storage 55.

Then, in step S33, the obtainer 61 obtains information about the surrounding conditions of the vehicle input from the vehicle surrounding condition detecting device 13. For example, the obtainer 61 obtains information about objects around the vehicle, such as other vehicles, bicycles, pedestrians, road signs, and other obstacles, and also obtains information about the distance to such an object and the relative velocity of the object. The obtainer 61 may obtain information about the width of a road. Then, in step S35, the obtainer 61 obtains information about the weather in a driving area of the vehicle input from the weather information detecting device 15. For example, the obtainer 61 obtains information about the amount of rainfall, the amount of snowfall, wind speed and direction, and icy road.

Then, in step S37, the condition setter 69 sets the number and the type of data to be used for calculating an evaluation value reflecting the magnitude of the behavior of the vehicle body, based on the information about driver's attributes, information about the surrounding conditions of the vehicle, and information about the weather in the driving area of the vehicle. In the embodiment, based on the setting example illustrated in FIG. 2, the condition setter 69 sets the number of data to be used for calculating the evaluation value. For example, the data items that can be used for evaluating the behavior stability are set to be twelve items of data, such as the longitudinal acceleration, lateral acceleration, vertical acceleration, angular velocity of yaw angle, that of pitch angle, that of roll angle, a jerk of longitudinal acceleration, that of lateral acceleration, that of vertical acceleration, angular acceleration of yaw angle, that of pitch angle, and that of roll angle. From among these items of data, the condition setter 69 sets the number of data items to be used for calculating the evaluation value.

In the setting example in FIG. 2, based on the information about driver's attributes, as the driver's driving skills are likely to be higher, the number of data items becomes larger, and, as the driver's driving skills are likely to be lower, the number of data items becomes smaller. In the setting example in FIG. 2, when the driving environments that are predicted from the information about the surrounding conditions of the vehicle and information about the weather are those where the behavior stability of the vehicle body is desirable to be higher or those where the behavior stability of the vehicle body is more likely to be lowered, the number of data items becomes larger. For example, the condition setter 69 sets the maximum number of data items to be twelve and the minimum number to be one and also sets the reference value to be five. The condition setter 69 then adds or subtracts one to or from five for each item of the obtained information, thereby determining the number of data items to be used. When determining the number of data items, the condition setter 69 prioritizes the use of data items about a jerk of longitudinal acceleration, a jerk of lateral acceleration, angular acceleration of yaw angle, and angular acceleration of pitch angle, which can reflect driver performance more accurately than the other data items. The condition setter 69 may set a data item reflecting the behavior of the vehicle body in either one of the front-back direction and the left-right direction of the vehicle as a data item to be used.

Then, in step S39, the condition setter 69 sets the upper limit value lim of the output sound variation region, based on the information concerning driver's attributes, information about the surrounding conditions of the vehicle, and information about the weather in the driving area of the vehicle. In the embodiment, the condition setter 69 sets the upper limit value lim of the output sound variation region in accordance with the setting example in FIG. 2. In the embodiment, the magnitude of the behavior of the vehicle body is evaluated by using one or plural items of data. Hence, individual data items to be used are converted into values represented by the same index (index value of 0 to 100, for example), and the average of the converted values is used as the evaluation value. The condition setter 69 sets the reference value of the upper limit value to be 50 and adds or subtracts 10 to or from the reference value in accordance with each item of the obtained information, thereby setting the upper limit value to one of the five levels, 30, 40, 50, 60, and 70, for example. The approach to determining the evaluation value from multiple data items and that to setting the upper limit value lim are not limited to the above-described examples.

In the setting example in FIG. 2, based on the information about driver's attributes, as the driver's driving skills are likely to be higher, the upper limit value lim is set to be a smaller value. Conversely, as the driver's driving skills are likely to be lower, the upper limit value lim is set to be a larger value. In the setting example in FIG. 2, when the driving environments that are predicted from the information about the surrounding conditions of the vehicle and information about the weather are those where the behavior stability of the vehicle body is desirable to be higher or those where the behavior stability of the vehicle body is more likely to be lowered, the upper limit value lim is set to be a smaller value.

Referring back to FIG. 6, after condition setting processing is executed in step S13, in step S15, the obtainer 61 obtains data indicating the behavior of the vehicle body sent from the vehicle body behavior measuring device 11. In the embodiment, the obtainer 61 obtains data items about the vehicle velocity, longitudinal acceleration, lateral acceleration, vertical acceleration, angular velocity of roll angle, that of pitch angle, and that of yaw angle.

Then, in step S17, the data processor 63 executes smoothing processing, absolute value conversion processing, and time derivative processing on each item of data obtained by the obtainer 61 so as to calculate the evaluation value representing the magnitude of the behavior of the vehicle body. In step S17, the data processor 63 may execute data processing only on the data items set in condition setting processing in step S13 and calculate the evaluation value. Alternatively, the data processor 63 may execute data processing on all the data items obtained in step S15 and calculate the evaluation value by using only the data items set in condition setting processing in step S13. In the embodiment, the data processor 63 converts individual data items to be used to values represented by the same index (index value of 0 to 100, for example) and determines the average of the converted values as the evaluation value. In step S19, the sound conversion processor 65 converts the calculated evaluation value to information indicating an output sound. In one example, the sound conversion processor 65 sets the output sound variation region in accordance with the upper limit value lim set in condition setting processing in step S13, and allocates each evaluation value to a corresponding level of a variation element of the output sound. In the embodiment, as the tone of the output sound, piano sounds are used, and the sound conversion processor 65 allocates each evaluation value to a corresponding sound note of a preset scale. In one example, if the evaluation value is in a region lower than or equal to the lower limit value of the output sound variation region, the sound conversion processor 65 sets the pitch level of the output sound to be the lowest note of the scale. If the evaluation value is in a region higher than or equal to the upper limit value of the output sound variation region, the sound conversion processor 65 sets the pitch level of the output sound to be the highest note of the scale. If the evaluation value is within the output sound variation region, the sound conversion processor 65 allocates each evaluation value within this region to the note of a corresponding piano key between the lowest note and the highest note of the scale. Then, the sound conversion processor 65 sets the pitch level representing the evaluation value calculated in step S17 to a corresponding pitch level of a piano sound to be output.

Then, in step S21, the output controller 67 controls the driving of the sound output device 31 based on information about the output sound set in step S19, and drives the sound output device 31 to output a piano sound with the set pitch level. As a result, driver performance evaluation is presented to the driver as audible sound in real time. The output sound does not include text information to be displayed or to be output as voice. This enables the driver to intuitively understand the content of driver performance evaluation while being prevented from being seriously distracted from driving.

Then, in step S23, the controller 53 judges whether the vehicle has stopped driving. If the vehicle has not stopped driving (NO in step S23), the controller 53 returns to step S13 and repeatedly executes steps S13 through S21. Since steps S13 through S21 are repeatedly executed at predetermined intervals while the vehicle is driving, the driver is able to recognize driver performance evaluation in real time. If the vehicle has stopped driving (YES in step S23), the controller 53 terminates auditory stimulation control in step S25.

4. Advantages of Embodiment

As described above, while a vehicle is driving, the driving support apparatus 1 according to the embodiment obtains data indicating behavior of the vehicle body and continuously outputs a sound that is changed in accordance with the behavior. The driving support apparatus 1 sets an upper limit value (threshold value) for an evaluation value indicating the magnitude of the behavior, based on the driving conditions of the vehicle. When the evaluation value is smaller than the upper limit value, the driving support apparatus 1 sequentially changes the sound in accordance with the evaluation value, and when the evaluation value is greater than or equal to the upper limit value, the driving support apparatus 1 outputs a fixed, flat sound. Then, the driver is able to recognize driver performance evaluation in real time during driving. The output sound does not include text information to be displayed or to be output as voice. This allows the driver to intuitively understand the content of information about driver performance via auditory stimulation while being prevented from being seriously distracted from driving.

In the driving support apparatus 1 according to the embodiment, within an output sound variation region, a variation element of the output sound is varied in accordance with a change in the evaluation value. The driver is thus able to intuitively recognize a change in the stability of the behavior of the vehicle body. In one example, within the output sound variation region, as the evaluation value is larger, the pitch or the frequency of the output sound becomes higher, the volume becomes louder, the tempo becomes quicker, or the number of sound tones consisting of a chord is decreased. This enables the driver to intuitively understand that the behavior stability of the vehicle body is decreasing. In the driving support apparatus 1 according to the embodiment, when the evaluation value is greater than or equal to the upper limit value, a fixed, flat sound is output. This enables the driver to intuitively understand that the behavior stability of the vehicle body is low.

The driving support apparatus 1 of the embodiment may set the upper limit value based on driver attribute information related to the driver's driving skills. In one example, as the driver's driving skills are higher, the upper limit value is set to be smaller, and, as the driver's driving skills are lower, the upper limit value is set to be larger. This can induce a driver having high driving skills to improve driver performance so that the behavior of the vehicle body can be more stable. This can also induce a driver having low driving skills to drive at a suitably stable level in accordance with his/her driving skills.

The driving support apparatus 1 of the embodiment may set the upper limit value based on information about the driving environments which influence the behavior stability of the vehicle body. In one example, when the driving environments are those where the behavior stability of the vehicle body is desirable to be higher or those where the behavior stability of the vehicle body is more likely to be lowered, the upper limit value is set to be smaller. This can induce a driver to drive more carefully so that the behavior of the vehicle body can be more stable.

The driving support apparatus 1 of the embodiment may stop executing auditory stimulation control in a driving environment where the behavior stability of the vehicle body is likely to be lowered. This can prevent an inaccurate evaluation from being presented to a driver and also avoid leading a driver to drive unsuitably based on such an inaccurate evaluation.

While the disclosure has been described through illustration of an embodiment with reference to the drawings, it is to be understood that the disclosure is not limited to this embodiment. Obviously, various modifications and variations will be apparent to those skilled in the art of the disclosure without departing from the technical scope of the claims, and it is to be understood that such modifications and variations are encompassed within the technical scope of the disclosure.

For example, in the embodiment, as predetermined control to be executed when the evaluation value is greater than or equal to the upper limit value, a fixed, flat sound is output. However, the predetermined control is not limited to this example. In the driving support apparatus 1 of the embodiment, within the output sound variation region, the output sound is varied in accordance with a change in the behavior of the vehicle body, and the driver is able to intuitively understand that the behavior of the vehicle body is decreasing, for example. When the evaluation value extends out of the output sound variation region, certain control other than outputting a fixed, flat sound may be executed to make the driver recognize that the behavior stability of the vehicle body is low. For example, when the evaluation value extends out of the output sound variation region, in addition to or instead of outputting a fixed, flat sound, the driving support apparatus 1 may perform control to interfere with the driving operation to stabilize the behavior of the vehicle body, such as displaying certain information at a position at which the driver can see it.

The controller 53 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 53 including the obtainer 61, the data processor 63, the sound conversion processor 65, the output controller 67, and the condition setter 69. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:
1. A driving support apparatus comprising:
sensors configured to obtain data indicating behavior of a body of a vehicle while the vehicle is traveling, wherein the data include acceleration of the vehicle; and
a controller configured to:

convert the data from the sensors into an evaluation value;

generate sound data representing sounds that convey consecutive change in the evaluation value in response to a real-time change in the behavior of the body of the vehicle;

control a sound device, disposed inside the vehicle, based on the sound data to output the sounds to allow the driver to know the change in the behavior of the body of the vehicle in real time;

set a threshold that is variable based on a condition surrounding the vehicle and a driving skill of a driver of the vehicle; and execute predetermined control of the sound device when a magnitude of the evaluation value is greater than or equal to the threshold.

2. The driving support apparatus according to claim 1, wherein the controller is configured to sequentially change the sound in accordance with a change in the evaluation value indicating the real-time changes in the magnitude of the behavior in the case where the value indicating the magnitude of the behavior is smaller than the predetermined threshold.

3. The driving support apparatus according to claim 1, wherein the controller is configured to set the threshold to be a smaller value as the driving skill of the driver is higher.

4. The driving support apparatus according to claim 2, wherein the controller is configured to set the threshold to be a smaller value as the driving skill of the driver is higher.

5. The driving support apparatus according to claim 1, wherein the controller is configured to set the threshold based on the condition surrounding the vehicle which influences stability of the behavior of the body of the vehicle.

6. The driving support apparatus according to claim 2, wherein the controller is configured to set the predetermined threshold based on the condition surrounding the vehicle which influences stability of the behavior of the body of the vehicle.

7. A driving support apparatus comprising:

sensors configured to obtain data indicating behavior of a body of the vehicle while the vehicle is traveling, wherein the data include acceleration of the vehicle; and circuitry configured to:

convert the data from the sensors into an evaluation value;

generate sound data representing sounds that conveys consecutive change in the evaluation value in response to a real-time change in the behavior of the body of the vehicle;

control a sound device, disposed inside the vehicle, based on the sound data to output the sound to allow the driver to know the change in the behavior of the body of the vehicle in real time;

set a threshold that is variable based on a condition surrounding the vehicle and a driving skill of a driver of the vehicle; and execute predetermined control of the sound device when a magnitude of the evaluation value is greater than or equal to the threshold.

\* \* \* \* \*